INVENTOR:
Curtis E. Stevens

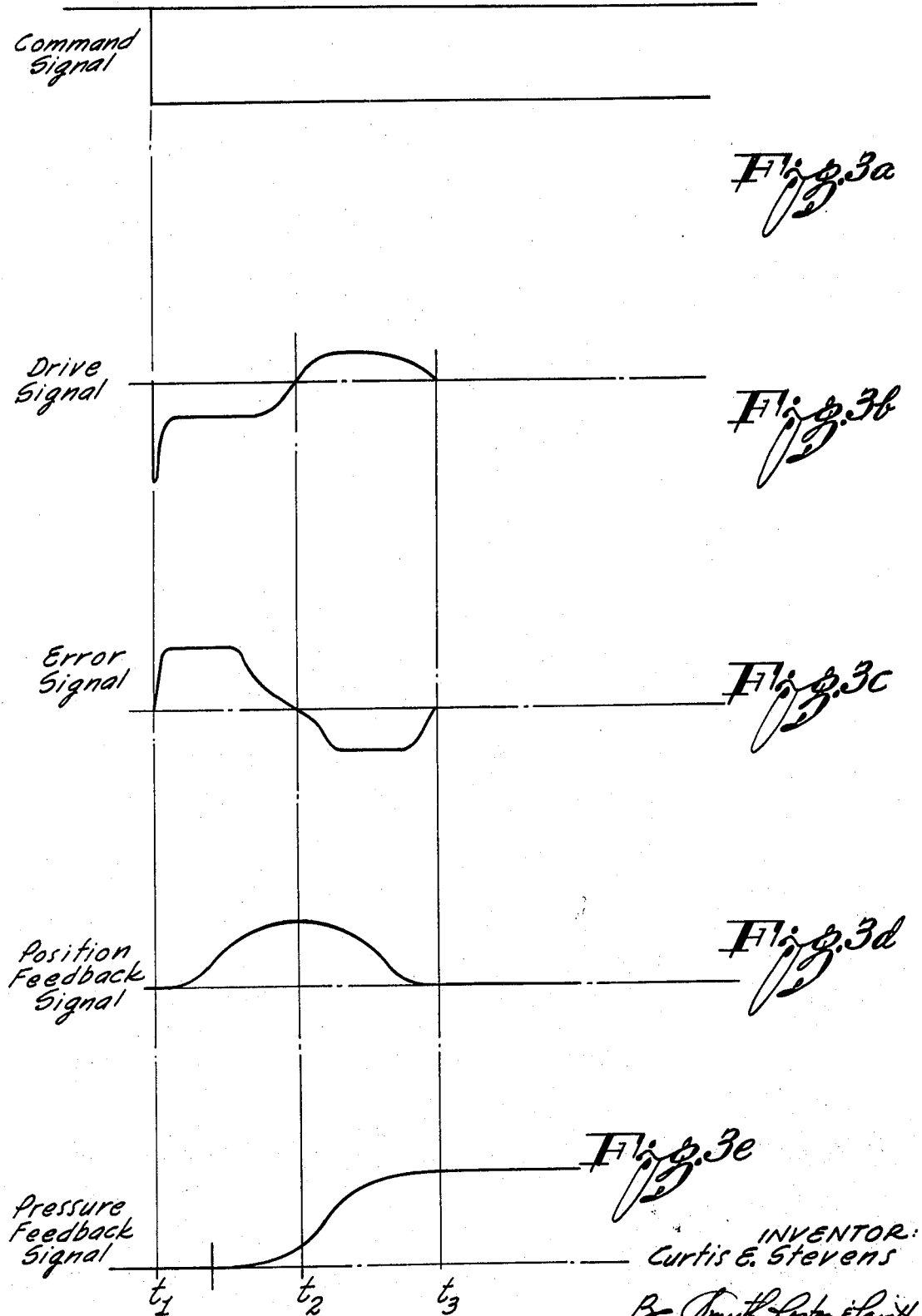

ATTORNEYS

United States Patent Office 3,671,082
Patented June 20, 1972

3,671,082
ANTISKID SYSTEM
Curtis Edgar Stevens, Irvine, Calif., assignor to
Bertea Corporation, Irvine, Calif.
Filed Mar. 4, 1970, Ser. No. 16,088
Int. Cl. B60t 8/08
U.S. Cl. 303—21 P
12 Claims

ABSTRACT OF THE DISCLOSURE

An antiskid system for a vehicle including a antiskid computer responsive to one or more skid parameters for providing an electrical control signal and a movable valve member for controlling the pressure of the fluid supplied to the brakes of the vehicle to thereby control the braking force. A position transducer provides a position feedback signal variable in accordance with the position of the valve element and a pressure transducer provides a pressure feedback signal variable in response to the absolute pressure of the fluid supplied to the brake. All of these signals are combined to provide a resultant signal, and a control device responsive to the resultant signal controls the position of the valve element to thereby control the pressure of the fluid supplied to the brake.

---

The present invention relates to braking systems for vehicles such as aircraft. Aircraft must, of necessity, be travelling at high velocities at the instant that the wheels contact the runway, and it is imperative that aircraft velocity be rapidly and safely reduced. One problem associated with braking of aircraft is eliminating or controlling skidding, i.e., slippage of the wheels on the runway. The likelihood of skidding for a given braking force is dependent upon numerous variable skid parameters such as wetness of the runway, aircraft wheel speed, aircraft velocity, etc. Accordingly, the maximum safe or desirable braking force is a function of the various skid parameters.

Skid control can be obtained by using an antiskid computer which produces an electrical command signal which varies in accordance with the skid parameters. The command signal is used to control an antiskid valve which controls the pressure of fluid supplied to the brakes. By controlling the fluid pressure, the braking force applied to the aircraft wheels can be controlled.

Prior skid control systems have not been as accurate and reliable as desired. For example, the braking force obtainable for a given signal from the antiskid computer would vary with certain factors such as hydraulic supply and return pressures. In addition, certain components of the antiskid valve were subject to oscillation and relatively high friction which produce rapid wear.

The present invention solves these problems and improves the skid control system. With the present invention the antiskid valve includes a movable valve element which controls the pressure of the fluid supplied to the brake. The position of the valve element is controlled by a fluid pressure signal which is supplied by control means. The control means is in turn controlled by an electrical command signal from the antiskid computer and one or more feedback signals.

Preferably the valve element is movable in either direction from a neutral or null position. In the null position, the valve element slightly exposes supply and return ports and fully exposes a port leading to the brakes of a vehicle. By moving the valve element in a first direction, the supply port is more fully exposed and the return port is progressively closed to thereby supply additional fluid under pressure to the brakes. Conversely, by moving the valve element in the opposite direction, the supply port is progressively closed while the return port is progressively opened to thereby cause a reduction in the fluid pressure applied to the brakes.

In operating the valve element to supply additional pressure to the brakes, it is necessary to first open the valve a predetermined amount. If the valve were allowed to remain open indefinitely, in a short period of time the downstream pressure would equal the upstream pressure. Accordingly, it is necessary to terminate opening movement of the valve element, and then return the valve element to the null position. The valve element must reach the null position at the instant that the downstream fluid pressure is at the required level to thereby provide the desired braking force.

Heretofore, mechanical springs have been utilized to retard movement of the valve element and to at least assist in returning the valve element to the neutral position. The present invention eliminates these mechanical springs and allows the valve element to move without mechanical restraint. This is accomplished by utilizing an electrical spring which is far superior to the mechanical spring in this environment in that the latter tends to cock the valve element within its housing thereby causing additional frictional forces which oppose movement of the valve element. The friction introduced by the mechanical spring increases wear on the valve element and causes oscillation of the valve element which in turn decreases the accuracy of the valve. The friction also limits the amount of loop gain around the system, and therefore further decreases system accuracy.

With the present invention, a position transducer provides a position feedback signal having an amplitude that is variable in accordance with the position of the valve element. The position feedback signal is summed with the command signal to provide a drive signal that causes a reduction in the fluid pressure signal tending to move the valve element as the valve element moves away from the null position, i.e., the net force tending to move the valve element is reduced as the valve element is displaced from its null posiiton. Thus, the effect of the position signal is that of an electrical spring in that the net force acting on the valve element tending to move the same is reduced in the same maner as though movement of the valve element were being opposed by a mechanical spring which produces no friction losses. However, the disadvantages of a mechanical spring are eliminated.

The control means preferably includes an electrohydraulic valve which is responsive to an electrical input such as the drive signal for providing a pressure signal for operating the valve element. Such an electrohydraulic valve preferably includes electromagnetic means responsive to the electrical input thereto for controlling the position ot a movable member. The position of the movable member in turn controls the fluid pressure signal supplied to the valve element. Such movable member is inherently subject to drift. However, with the present invention, such drift is held to a minimum by the high gain of the system. High system gain can be used to advantage because the effect of drift of the movable member is decreased in that the effect of drift is inversely proportional to the system gain. System drift is primarily controlled by a pressure transducer which is much lower than that of the movable member.

Another feature of the present invention is that the pressure feedback signal has an amplitude that varies in accordance with the absolute pressure of the fluid downstream of the movable valve element. Heretofore such feedback signals in braking systems had varied in accordance with a given pressure differential such as the difference between the pressure of the fluid supplied to the brake and return pressure. Such prior art systems introduced an inherent inaccuracy into the system in that a plot of pressure supplied to the brakes versus the command signal from the antiskid computer would yield a family of curves having different slopes. Thus, for any given computer command signal, the pressure of the fluid supplied to the brake would vary with other factors such as supply or return pressure. The present invention provides much more accurate results in that for any given computer signal, the pressure of the fluid supplied to the brake is the same regardless of the supply and return pressure levels so long as the pressure commanded by the computer is between the supply and return pressures. This advantage is due to the fact that the pressure transducer senses absolute pressure as opposed to differential pressure supplied to the brake.

The braking force is a reaction of all other forces acting on the brake cylinders in the wheels. In addition to friction and return springs, the other force is atmospheric pressure. The ideal pressure transducer would be one which senses the difference between braking pressure and atmospheric pressure. Such a transducer, which is known as a "gage pressure" transducer, is easily contaminated because of the required atmospheric vent. Since atmospheric pressure changes are small, they may be discounted and an absolute pressure transducer substituted as a more reliable unit.

The invention, both as to its organization and method of operation, can best be understood by reference to the following description taken in connection with the accompanying illustrative drawing.

FIG. 3a is a plot of command signal from the computer versus time.

FIG. 3b is a plot of the drive signal fed to the amplifier versus time.

FIG. 3c is a plot of the signal fed to the electrohydraulic valve versus time.

FIG. 3d is a plot of the position feedback signal versus time.

FIG. 3e is a plot of the pressure feedback signal versus time.

Figure 1:
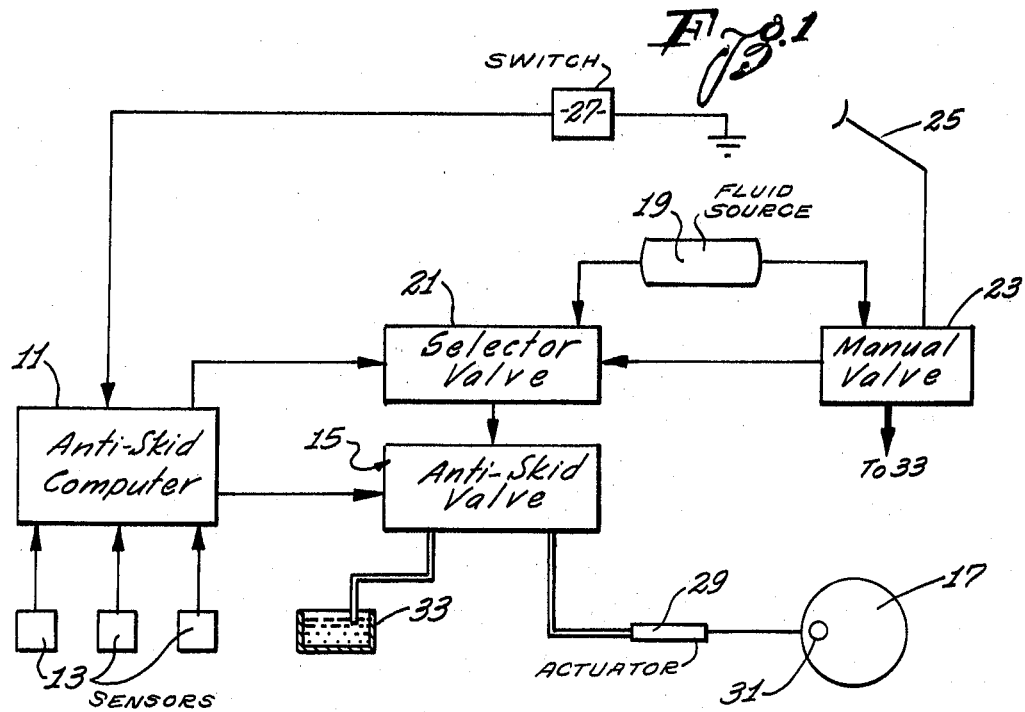
FIG. 1 is a schematic view of an antiskid system for an aircraft constructed in accordance with the teachings of this invention.

Referring to the drawings and in particular to FIG. 1 thereof, an antiskid computer 11 receives electrical input signals from a plurality of skid parameter sensors 13. Each of the skid parameter sensors 13 senses a particular braking condition or skid parameter such as aircraft speed, velocity of the aircraft wheel, etc. Although three of the sensors 13 are illustrated in FIG. 1, any number of these sensors may be utilized depending upon the quantity of information which it is desired to provide the computer 11.

Antiskid computers for aircraft braking systems are known and, accordingly, the computer 11 is not shown in detail. The computer 11 provides an electrical control or command signal to an antiskid valve 15. The control signal corresponds to a preselected braking force which the computer 11 determines can be safely applied to a wheel 17 of the aircraft (not shown) based upon the information supplied by the sensors 13. Of course, the computer 11 can be programmed to provide any desired braking action.

The antiskid valve 15 receives hydraulic fluid under pressure from a source 19. The fluid may flow from the source 19 directly through a selector valve 21 to the antiskid valve 15 or through a manual valve 23 and the selector valve 21. The manual valve 23 is controlled directly by the pilot such as with a linkage 25. The selector valve 21 is a three-way valve which can be set to supply fluid directly from the source 19 to the antiskid valve 15 while blocking flow from the manual valve 23. Alternatively, the selector valve 21 can be set to block flow from the source 19 and to supply fluid from the manual valve 23 to the antiskid valve 15. The selector valve 21 is controlled by a pilot operated switch 27 through the antiskid computer 11 or in any other suitable manner.

In any event, the antiskid valve 15 receives fluid under pressure therethrough to either control or to limit the amount of braking force supplied to the wheel 17. The hydraulic fluid from the antiskid valve 15 flows to an actuator 29 which operates a disc brake 31 for the wheel 17. Some hydraulic fluid from the antiskid valve 15 flows to a closed pressurized return tank 33.

In the operation of the system shown in FIG. 1, the pilot may elect to have the aircraft brakes applied completely automatically by the antiskid computer 11. In this event, the switch 27 is moved appropriately so that the selector valve 21 will block flow from the manual valve 23 and permit flow directly from the source 19 to the antiskid valve 15. In this event, the antiskid valve 15 controls the pressure of the hydraulic fluid supplied to the actuator 29 to maintain the braking force at the limit set by the antiskid computer 11.

Alternatively, the pilot may choose to manually apply the brakes 31 in which event the switch 27 is appropriately operated to cause the selector valve 21 to block hydraulic fluid flow directly from the source 19 to the antiskid valve 15 while permitting flow from the manual valve 23 to the antiskid valve 15. The pilot then operates the manual valve 23 through the linkage 25 to control the fluid pressure downstream of the manual valve 23. The manual valve 23 provides the desired pressure at the actuator 29 by controlling the flow of hydraulic fluid flowing therethrough to the actuator and to the return 33. In this event, the antiskid valve 15 may perform an overriding safety function or modulating function in preventing the hydraulic fluid pressure from exceeding the magnitude which the antiskid computer 11 has determined is safe. Alternatively, the pilot may completely override the antiskid computer 11 in which event the antiskid valve 15 may be held fully open by the antiskid computer so that the system is completely under the control of the manual valve 23.

Figure 2:
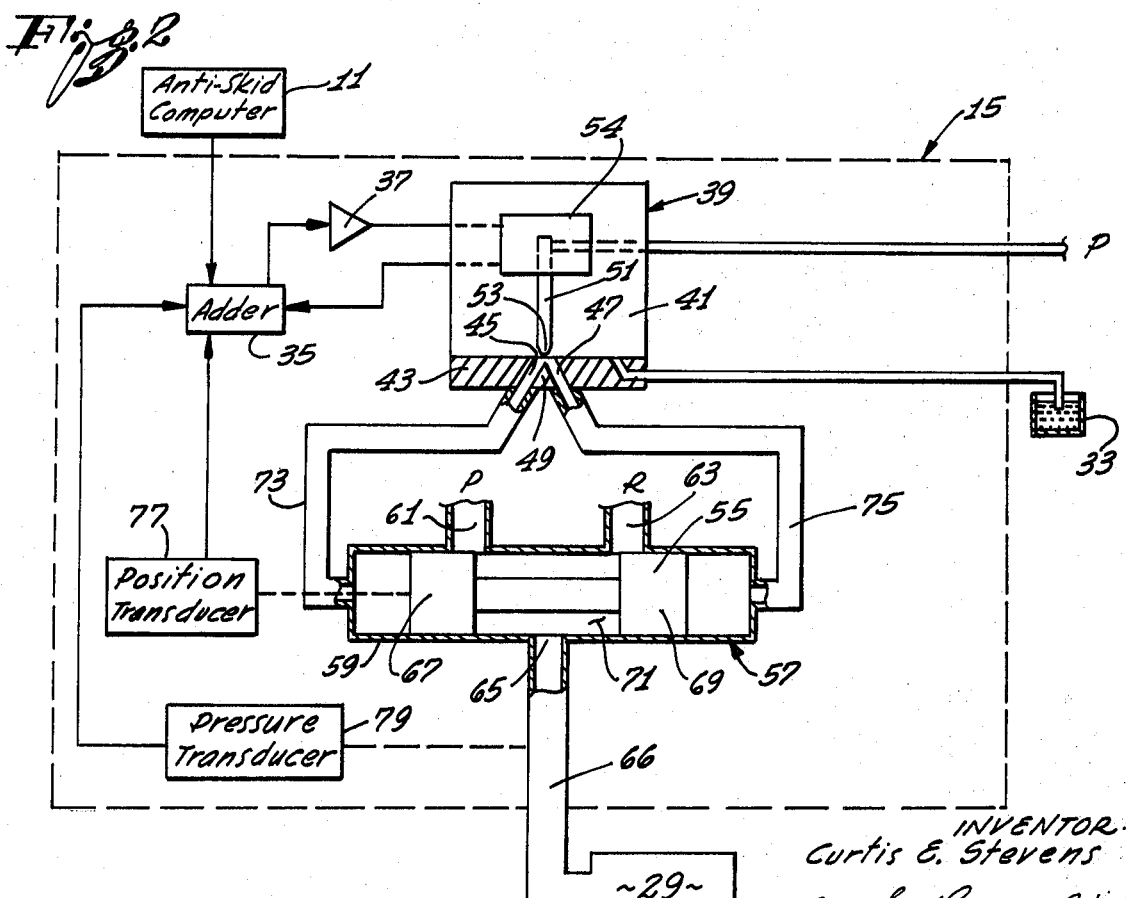
FIG. 2 is a schematic view of the antiskid valve with the jet pipe and valve element in the null position.

As shown in FIG. 2, the command signal from the antiskid computer 11, a position feedback signal from a position transducer 77, a pressure feedback signal from a pressure transducer 79 and an error feedback signal from an electromagnetic means 54, are applied to an adder 35. The adder 35 provides an output signal or drive signal that is proportional to the summation of the amplitudes of the received signals. The drive signal provided by the adder 35 is applied to an operational amplifier 37 that inverts and amplifies the received drive signal to provide an inverted drive signal or resultant signal which is applied to the electromagnetic means 54 in a first stage valve which is an electrohydraulic valve 39. The operational amplifier has a high gain which, for example, may be 50,000. The electrohydraulic valve 39 may be of any type which produces an output fluid signal having a characteristic which varies in accordance with variations in an electrical input signal. In the embodiment illustrated, the input signal to the electrohydraulic valve is the drive signal from the amplifier 37 and the characteristic of the fluid signal is pressure with the pressure of the fluid signal being proportional to the amplitude of the drive signal.

In the embodiment illustrated, the electrohydraulic valve 39 includes a housing 41 having a receiver 43. The receiver 43 has a pair of receiver passages 45 and 47 separated by a divider 49. A jet pipe 51 having a nozzle 53 is pivotally mounted in a conventional manner within the housing 41 to permit movement of the nozzle 53 into registry or partial registry with either of the receiver passages 45 and 47 or to a null or neutral position intermediate the receiver passages 45 and 47. The nozzle 53 is spaced only slightly from the receiver passages 45 and 47 and from the divider 49. The jet pipe 51 is connected to receive fluid under pressure from the source 19 (FIG. 1) so that by movement of the jet pipe 51, the fluid exiting through the nozzle 53 can be caused to enter either or both of the receiver passages 45 and 47. Of course, the jet pipe 51 can be mounted in any suitable way which will permit the necessary movement of the nozzle 53 relative to the receiver passages 45 and 47, and the pivotal mounting shown in FIG. 2 is purely illustrative. Fluid exiting from the nozzle 53 and not received in the passages 45 and 47 is fed to the closed return tank 33. When the jet pipe 51 is at null, all fluid exiting therefrom flows to the return tank 33.

The jet pipe 51 is moved by the electromagnetic means 54 which may be a torque motor. The electromagnetic means 54 is coupled to receive the inverted drive signal provided by the amplifier 37 and imparts movement to the jet pipe 51 in accordance with the received signal. Within the range of movement of the jet pipe 51, the displacement of the jet pipe 51 from null is proportional to the magnitude of the amplitude of the inverted drive signal supplied thereto. The electromagnetic means 54 moves the jet pipe 51 in one direction when the drive signal supplied thereto has a positive amplitude and in the other direction when the drive signal has a negative amplitude. When the inverted drive signal has substantially a zero amplitude, the jet pipe 51 is at a null and such result is obtainable, for example, by utilizing a conventional centering device. The error feedback signal is fed from the electromagnetic means 54 to the adder 35. Electrohydraulic valves of the kind described are known to those skilled in the art.

The fluid from the electrohydraulic valve 39 controls the movement of a valve element 55 of a second stage valve 57. The second stage valve 57 includes a housing 59 having an inlet port 61 in communication with fluid under pressure from the selector valve 21 (FIG. 1), a return port 63 in communication with the return tank 33 and an outlet port 65 for providing fluid under pressure through a conduit 66 to the actuator 29 of the disc brake 31 (FIG. 1).

The valve element 55 includes lands 67 and 69 separated by an annular groove 71 which forms a fluid passage through the valve 57. In the null position of the valve element 55 shown in FIG. 2, the passage 71 is in communication with the outlet port 65 to provide fluid to the actuator 29, and the lands 67 and 69 block off major portions of the ports 61 and 63, respectively, so that only very minor portions of the ports 61 and 63 are exposed to the passage 71. The inlet port 61 is opened sufficiently to maintain the necessary pressure in the actuator 29 notwithstanding the slight opening of the return port 63.

Opposite ends of the housing 59 are connected by passages 73 and 75 to the receiver passages 45 and 47, respectively. Accordingly, the opposite ends of the housing 59 receive fluid under pressure from the receiver passages 45 and 47 with such fluid acting on the valve element 55 to control the position thereof. Thus, the electrohydraulic valve 39, in the embodiment illustrated, constitutes control means for controlling the position of the valve element 55. As shown in FIG. 2, the valve element 55 is not mechanically restrained by springs or otherwise so it is not subject to the usual frictional losses due to mechanical restraining means.

It is apparent from viewing FIG. 2 that the valve element 55 can be moved so as to progressively open the inlet port 61 an additional amount while simultaneously progressively blocking off the return port 63 to rapidly increase the fluid pressure at the actuator 29 and thereby increase the braking force acting on the disc brake 31 of the aircraft. Similarly, by moving the valve element 55 in the opposite direction, the inlet port 61 is progressively blocked off while simultaneously the return port 63 is progressively opened to decrease the fluid pressure to the actuator 29 and thereby decrease the braking force acting on the disc brake 31 of the aircraft.

In actual operation of the valve element 55 to increase the fluid pressure supplied to the actuator 29, the valve element 55 is moved to the left as viewed in FIG. 2 to progressively further expose the inlet port 61. Subsequently, the valve element 55 is returned to the null position and during the entire time that the valve element 55 has been displaced from the null position, pressure is increasing at the actuator 29. The system is designed so that the valve element 55 returns to the null position at the instant that the pressure in the actuator 29 is equal to the pressure commanded by the antiskid computer 11 for producing the desired braking force. With the valve element 55 at its null position, the valve element maintains the increased pressure at the actuator 29.

Since the position of valve element is controlled by the fluid from the electrohydraulic valve 39, it is necessary to determine when the desired braking force 15 is imparted to the actuator 29. Consequently, the position transducer 77 is coupled to sense the position of the valve element 55, and the pressure transducer 79 is coupled to sense the pressure in the conduit 66 or at the actuator.

The position transducer 77 is operably coupled to the valve element 55 for providing the position feedback signal that has a signal amplitude related to the position of the valve element 55. In the embodiment illustrated, the amplitude of the position feedback signal is proportional to the displacement of the valve element 55 from its null position, and the polarity of the position feedback signal depends upon the direction of displacement of the valve from its null position. Furthermore, when the valve element returns to the null position, the amplitude of the pressure feedback signal decreases to substantially zero amplitude.

The pressure transducer 79 is operably coupled to the conduit 66 to provide the pressure feedback signal the amplitude of which is related to the absolute pressure of the fluid in the conduit 66.

The pressure feedback signal has an amplitude which is proportional to the absolute pressure. Accordingly, as the absolute pressure in the conduit 66 increases, the pressure feedback signal increases in amplitude in response thereto. As used herein, absolute pressure means the pressure over a fixed reference level. Preferably the fixed reference level is zero p.s.i. absolute. The pressure transducer 79 may provide the feedback signal in response to the absolute pressure at any point in the conduit 66 downstream of the valve element 55, although a location closely adjacent the actuator 29 is preferred.

The operation of the antiskid valve 15 can be understood by assuming that the jet pipe 51 and the valve element 55 are initially in their null positions and that a control or command signal is initiated by the computer 11 which calls for a particular braking force. With the jet pipe 51 at null, the valve element 55 is stationary.

At the initiation of the control signal, the drive signal provided by the adder 35 will be substantially equal to the command signal until the error signal is initiated by the electromagnetic means 54. The drive signal provided by the adder 35 is applied to the amplifier 37 to produce the inverted drive signal which is applied to the electromagnetic means 53 to energize the latter. This causes the jet pipe 51 to move toward the receiver passage 47 with the displacement of the jet pipe from its null position being proportional to the amplitude of the inverted drive signal applied to the electromagnetic means 54. Such displacement of the jet pipe 51 causes greater quantities of fluid under pressure to be supplied from the jet pipe through the receiver passage 47 to the righthand end of the valve element 55 than to the lefthand end of the valve element 55. This creates a pressure differential across the valve element 55 which moves the valve element to the left. Such movement of the valve element 55 progressively further opens the inlet port 61 while progressively closing the return port 63 to thereby supply fluid under pressure to the actuator 29.

In response to the displacement of the valve element 55 from the null position, the position feedback signal increases in amplitude, and the pressure feedback signal increases in amplitude as the absolute pressure in the conduit 66 increases. The position feedback signal and the pressure feedback signal are applied to adder wherein they are summed with the command signal and the error signal. Since the polarity of the feedback signals 13 opposite to the polarity of the comamnd signal and since the adder 35 algebraically sums the received signals, the drive signal decreases in amplitude.

Thus, as the feedback signals from the transducers 77 and 79 increase in amplitude and decrease the amplitude of the inverted drive signal, the jet pipe 51 is progressively returned toward its null position by the electromagnetic means 54. When the inverted drive signal has a zero amplitude the jet pipe is at its null position and movement of the valve element 55 ceases. When the jet pipe 51 returns to its null position, the valve element 55 is at its maximum displacement from its null position, and the amplitude of the position feedback signal is at a maximum amplitude.

Because the valve 57 is open, the absolute pressure downstream of the valve element 55 continues to increase causing a corresponding increase in the amplitude of the pressure feedback signal from the pressure transducer 79. This is sufficient to cause the inverted drive signal to change polarity, which in turn initiates movement of the jet pipe 51 in the opposite direction away from its null position toward the receiver passage 45. Greater quantities of fluid under pressure are then upplied through the jet pipe 51 to the lefthand end of the valve element 55 (as viewed in FIG. 2) to cause displacement of the valve element 55 to the right with progressive closing of the inlet port 61 and progressive opening of the return port 63. Such movement of the valve element 55 toward its null position reduces the amplitude of the position feedback signal from the position transducer 77; however, as fluid pressure downtream of the valve element 55 continues to increase, the pressure feedback signal from the pressure transducer 79 continues to increase. The result is that the inverted drive signal applied to the electrohydraulic valve 39 continues to cause the valve element 55 to return toward its null position.

Ultimately, with the valve element 55 approaching its null position, the pressure feedback signal approaches a constant amplified level and the amplitude of the position feedback signal approaches zero. This effect causes the drive signal applied to the amplifier 37 and the inverted drive signal applied to the electrohydraulic valve 39 to return toward zero amplitude. This causes corresponding movement of the jet pipe 51 toward its null position. When the inverted drive signal reaches substantially zero amplitude, the jet pipe 51 returns to its null position in response thereto. The jet pipe 51 and the valve element 55 return to their null positions at the instant that the pressure downstream of the valve element 55 is the pressure commanded by the computer 11 to produce the desired braking effect. This steady state condition is maintained until the command signal from the computer 11 changes at which time the process as described above is repeated. The braking force can be reduced or removed by an appropriate change in the command signal from the antiskid computer.

The operation of the electrical signals for controlling the antiskid valve 15 can be more readily understood by reference to FIGS. 3a–e which show illustrative wave forms. The signals depicted in FIGS. 3a–e are current signals. FIG. 3a shows an illustrative command signal from the antiskid computer 11 which is initiated at time $t_1$. In the embodiment illustrated, the command signal is a constant D.C. signal which is negative in polarity. The amplitude of the particular command signal will produce a particular output pressure on the actuator 29 and a corresponding braking force on the disc brake 31. Of course, the command signal provided by computer 11 will change as the input thereto from the sensors 13 changes.

FIG. 3b shows a typical drive signal provided by the adder 35 and which is applied to the amplifier 37. The drive signal illustrated is a negative signal from time $t_1$ to time $t_2$ and is positive from time $t_2$ to time $t_3$. The drive signal rapidly increases in amplitude following initiation of the command signal to produce a spike and then drops off to a lesser value. The drive signal reaches zero amplitude at time $t_2$ which corresponds to the time when the position feedback signal (illustrated in FIG. 3d) has a maximum amplitude. Subsequently, the drive signal increases in amplitude in response to an increase in amplitude of the pressure feedback signal (illustrated in FIG. 3e). Ultimately, the drive signal returns to a zero value at time $t_3$, which is the time when the position feedback signal has substantially a zero amplitude and the pressure feedback signal has a maximum amplitude.

The error signal provided by the electromagnetic means 54 is shown in FIG. 3c. Because the operational amplifier 37 inverts the signal, the error signal provided by the electromagnetic means 53 is substantially the inverse of the drive signal and has an amplitude equal to the drive signal increased an amount equal to the amplification factor of the amplifier 37. Except for transient conditions, the error signal has a wave form substantially identical to the wave form of the drive signal except for the phase inversion. Because of the response time of the electromagnetic means 54, the transient produced in the drive signal at the initiation of the command signal is not reflected in the error signal.

FIG. 3d shows the position feedback signal provided by the position transducer 77 in response to displacement of the valve element 55. The position feedback signal represented in FIG. 3d is a signal that is proportional to the displacement of the valve element 55 from the null position. As the valve element is displaced, the position feedback signal increases in amplitude until a maximum displacement of the valve element 55 is reached which occurs at time $t_2$. Subsequent to time $t_2$, the position feedback signal decreases in amplitude as the valve element 55 returns to the null position.

FIG. 3e shows the pressure feedback signal provided by the pressure transducer 79. The pressure feedback signal is proportional to the absolute pressure downstream of the valve element 55. The feedback signal from the pressure transducer 79 is initiated and continues to increase in amplitude in response to increases in absolute pressure. When the pressure in the conduit 66 corresponds to that pressure feedback signal commanded by the antiskid computer 11, the pressure feedback signal becomes substantially constant and this occurs at time $t_3$. The amplitude of the pressure feedback signal at time $t_3$ is substantially equal in amplitude to but opposite in polarity of the command signal.

As shown in FIGS. 3a–e, when an equilibrium condition is reached at time $t_3$, the pressure feedback signal 53 is equal in amplitude to the command signal with the result that these two signals cancel. Thus, the corresponding drive signal has substantially a zero amplitude and the corresponding inverted drive signal applied to the electromagnetic means 53 has a zero amplitude resulting in the valve element 55 remaining in an equilibrium condition until the command signal is changed in amplitude.

Figure 4A:
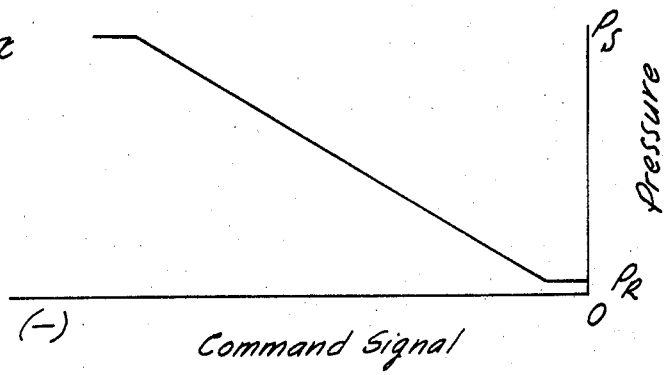
FIG. 4a is a plot of pressure of the fluid supplied to the brakes versus command signal from the computer for a system constructed in accordance with the teachings of the present invention.

FIG. 4a is a plot of pressure downstream of the valve element 55 versus the command signal supplied by the antiskid computer 11. In the form illustrated the pressure increases as the command signal becomes more negative.

It will be noted that variation of pressure with command signal between supply pressure $P_S$ and return pressure $P_r$ varies along a single path. In the embodiment illustrated, the path is linear. The practical effect of this is that for any given command signal, a predetermined known pressure output will result which in turn can be relied upon to give a predetermined braking force. Of course, any command signal calling for more pressure than is available at the supply or less pressure than in the return system cannot be obtained. However, substantial accuracy and repeatability is obtained within the pressure range available to the braking system.

Figure 4B:
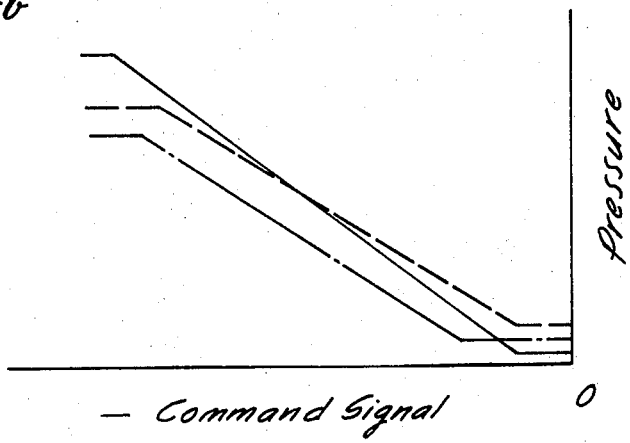
FIG. 4b shows a typical family of curves of pressure versus command signal for a braking system in which the pressure transducer does not provide a feedback signal which varies in accordance with absolute pressure supplied to the brakes.

FIG. 4b shows by way of illustration typical variations in command signal and pressure applied to the brake if the pressure transducer 79 senses differential rather than absolute pressure. In this instance, a whole family of curves exists, and the three curves shown are merely by way of illustration. The several different curves are the result of variations introduced through the sensing of differential pressure by the pressure transducer. Such variations may be caused by changes in supply or return pressure. In FIG. 4b the upper horizontal portions of the curves represent supply pressure and the lower horizontal portions of the curves represent return pressure. It is evident from FIG. 4b that any given command signal will produce several different pressures of fluid supplied to the brake depending upon which curve the system is presently operating under. It is this inaccuracy and nonrepeatability which the present invention overcomes through the sensing of absolute pressure by the pressure transducer 79.

Although an exemplary embodiment of the invention has been shown and described, many changes, modifications, and substitutions can be made by one having ordinary skill in the art without necessarily departing from the spirit and scope of this invention.

I claim:
1. A system for operating a brake of a vehicle comprising:
first means for providing fluid under supply pressure;
conduit means for conducting the fluid under pressure from said first means to the brake to operate the latter with the pressure of the fluid at the brake controlling the braking force;
means defining a fluid pressure zone with said zone being at a lesser pressure than said supply pressure;
second means responsive to at least one braking parameter for providing an electrical command signal corresponding to a particular braking force;
a valve element movable in said conduit means to control the pressure of the fluid supplied through said conduit means to the brake, said valve element having a null position in which the valve element holds the pressure down-stream of the valve element substantially constant, said valve element being movable toward and away from the null position to change the pressure of the fluid supplied through the conduit means to the brake;
transducer means for providing an electrical position signal variable in accordance with the displacement of the valve element from the null position;
means for combining said command signal and said position signal to provide a resultant signal; and
control means for providing a fluid pressure signal to control the position of said valve element in accordance with the resultant signal whereby the pressure supplied to the brake is controlled, said electrical position signal causing a reduction in said pressure signal as the valve element moves away from the null position whereby the effect of said position signal on movement of the valve element is that of an electrical spring.

2. A system as defined in claim 1 wherein said particular braking force is the maximum allowable braking force and including control valve means in said conduit means in series with said valve element and controllable by the operator of said vehicle whereby said valve element performs a safety function in limiting the maximum pressure which can be supplied to the brake.

3. A system as defined in claim 1 wherein said valve element is movable in said conduit means substantially without mechanical restraint whereby movement of said valve element continues until said pressure signal is changed sufficiently to halt such movement of the valve element.

4. A system as defined in claim 1 wherein said electrical position signal is substantially proportional to the displacement of the valve element from the null position.

5. A system for operating a brake of a vehicle comprising:
first means for providing fluid under pressure;
conduit means for conducting the fluid under pressure from said first means to the brake to operate the latter with the pressure of the fluid at the brake controlling the braking force;
second means responsive to at least one braking parameter for providing an electrical command signal corresponding to a particular braking force;
third means including a movable member for controlling the pressure of the fluid supplied through said conduit means to the brake;
transducer means for providing an infinitely variable electrical position signal variable in accordance with the position of the movable member;
means for combining said command signal and said position signal to provide a resultant signal; and
control means for providing a fluid pressure signal to control the position of said movable member in accordance with the resultant signal whereby the pressure supplied to the brake is controlled.

6. A system for operating the brakes of a wheel of an airplane comprising:
a source of hydraulic fluid under supply pressure;
conduit means for conducting the fluid under pressure from said source to the brake to operate the latter with the pressure of the fluid at the brake controlling the braking force;
antiskid computer means responsive to a plurality of braking parameters relating to the likelihood of skidding of the wheels of the airplane on the runway for providing an electrical command signal the amplitude of which corresponds to a particular braking force;
a fluid pressure zone at lesser fluid pressure than said supply pressure;
a valve element movable to control the flow of fluid from the source to the brake and to said zone and from the brake to said zone to thereby control the braking force;
position transducer means for providing an electrical position signal the amplitude of which varies in acaccordance with valve element position;
pressure transducer means for providing an electrical feedback signal the amplitude of which varies in accordance with the fluid pressure supplied by the valve element to the brake; and
electrohydraulic valve means responsive to all of said electrical signals for providing a fluid pressure signal for controlling the movement of the valve element whereby the pressure of the fluid supplied to the brake is controlled.

7. A system as defined in claim 6 including means for algebraically summing said electrical signals to form a resultant signal, means for amplifying the resultant signal, said electrohydraulic valve means being responsive to the amplified resultant signal to provide said fluid pressure signal.

8. A system as defined in claim 7 including means for providing an error feedback signal from said electrohydraulic valve means, said error feedback signal being fed to said means for algebraically summing.

9. A system as defined in claim 6 wherein said signals from both of said transducer means and said command signal are alegbraically summed to provide a resultant signal which is fed to said electrohydraulic valve means, said signals from both of said transducer means being of opposite polarity to said command signal.

10. A system as defined in claim 6 wherein said position signal and said feedback signal are proportional to valve element position and absolute fluid pressure, respectively, said position signal and said feedback signal opposing said command signal whereby the effect of said position signal on movement of said valve element is that of an electrical spring.

11. A system for operating a brake of a vehicle comprising:

first means for providing fluid at supply pressure;

conduit means for conducting the fluid under pressure from said first means to the brake to operate the latter with the pressure of the fluid at the brake controlling the braking force;

a fluid return system, the pressure of fluid in the return system being less than the supply pressure;

second means responsive to at least one braking parameter for providing an electrical command signal corresponding to a particular braking force;

pressure transducer means for providing an electrical pressure feedback signal which varies in accordance with the absolute pressure of the fluid supplied to the brake by said conduit means whereby said feedback signal is independent of any variation in supply and return pressures so long as said absolute pressure is intermediate the absolute supply and return pressures;

means for combining said command signal and said feedback signal to produce a resultant signal;

valve means in said conduit means and responsive to the resultant signal for controlling the flow of fluid at supply pressure to the brake and to the return system to control the pressure of the fluid supplied to the brake in accordance with said resultant signal; and said valve means including a movable valve element for controlling the pressure of the fluid supplied to the brake, said system including position transducer means for providing an electrical position signal variable in accordance with the position of the valve element, said means for combining being operable to combine said position signal with said command and feedback signals to produce said resultant signal.

12. A system as defined in claim 11 wherein said valve means includes electrohydraulic valve means responsive to the resultant signal for producing a fluid pressure signal variable in accordance with said resultant signal, said valve element being movable in accordance with said fluid pressure signal to control the flow of fluid at supply pressure supplied to the brake.

References Cited

UNITED STATES PATENTS

| | | | |
|---|---|---|---|
| 3,433,536 | 3/1969 | Skinner | 188—181 CX |
| 3,516,715 | 6/1970 | Fielek, Jr., et al. | 303—21 AF |
| 3,362,757 | 1/1968 | Marcheron | 303—21 P |
| 3,486,801 | 12/1969 | Frayer | 303—21 F |
| 3,494,670 | 2/1970 | Leiber | 303—21 F |

MILTON BUCHLER, Primary Examiner

S. G. KUNIN, Assistant Examiner

U.S. Cl. X.R.

244—111; 303—20, 20A